(12) United States Patent
Rood et al.

(10) Patent No.: US 6,364,936 B1
(45) Date of Patent: Apr. 2, 2002

(54) SELECTIVE SORPTION AND DESORPTION OF GASES WITH ELECTRICALLY HEATED ACTIVATED CARBON FIBER CLOTH ELEMENT

(75) Inventors: Mark J. Rood; Patrick Sullivan, both of Champaign; K. James Hay, Mahomet, all of IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/571,626

(22) Filed: May 15, 2000

(51) Int. Cl.⁷ .............................................. B01D 53/04

(52) U.S. Cl. .............................. 95/115; 95/143; 95/148; 96/126; 96/130; 96/146

(58) Field of Search .............................. 95/90, 114, 115, 95/141, 143, 148, 14, 17, 18; 96/126, 130, 143, 146

(56) References Cited

U.S. PATENT DOCUMENTS

| | | | | |
|---|---|---|---|---|
| 4,726,817 A | * | 2/1988 | Roger ........................... | 95/115 |
| 4,737,164 A | * | 4/1988 | Sarkkinen .................. | 95/148 X |
| 5,110,328 A | * | 5/1992 | Yokota et al. ............. | 95/141 X |
| 5,308,457 A | * | 5/1994 | Dalla Betta et al. ....... | 96/146 X |
| 5,388,637 A | * | 2/1995 | Jones et al. ................ | 96/126 X |
| 5,575,832 A | * | 11/1996 | Boyd ........................ | 95/141 X |
| 5,827,355 A | * | 10/1998 | Wilson et al. ................. | 95/114 |
| 5,912,424 A | * | 6/1999 | Judkins et al. ................. | 95/143 |

FOREIGN PATENT DOCUMENTS

| | | | | |
|---|---|---|---|---|
| DE | 3644126 | * | 7/1988 | ................... 95/148 |
| FR | 2659869 | | 9/1991 | |
| JP | 54-126670 | * | 10/1979 | ................... 95/141 |

OTHER PUBLICATIONS

P.D. Sullivan, technical paper entitled "Volatile Organic Compound Recovery Using Activated–Carbon Fiber–Cloth with Rapid Electrothermal Desorption", pp. 1–12.

P.D. Sullivan, M.J. Rood, K.J. Hay, technical paper entitled "Volatile Organic Compound Recovery Using Activated Carbon Fiber–Cloth with Rapid Electrothermal Desorption", pp. 1–12.

Sullivan et al., technical paper entitled "Capture and Recovery of Hazardous Organic Vapor with Adsorption, Electrothermal Desorption, and Condensation", *ASCE's Journal of Environmental Engineering*, Jan. 27, 2000.

M. Lordgooei, M.J. Rood, M. Rostam–Abadi, "Modeling Effective Diffusivity of Volatile Organic Compounds in Activated Carbon Fiber", submitted to *Environmental Science & Technology*, May 2000, pp. 1–29.

(List continued on next page.)

*Primary Examiner*—Robert H. Spitzer
(74) *Attorney, Agent, or Firm*—Greer, Burns & Crain, Ltd.

(57) ABSTRACT

An adsorption/desorption unit includes a hollow enclosure containing one or more elongate hollow elements of activated carbon fiber cloth (ACFC) of appropriate length to cross sectional area to provide suitable electrical resistance for heating. The elements conduct electrical current to heat to a temperature that permits selective adsorption of a gas stream constituent and subsequent desorption to recover sorbate. An enclosure houses the ACFC elements and is arranged to direct gas stream flow through the elements and into and out of the enclosure via gas ports. The ability to heat the elements to a desired temperature by electrical current flow allows for straightforward implementation of selective adsorption. After an adsorption step, altering the temperature of the element or elements enables desorption. In a particularly preferred embodiment, the enclosure with the element also includes a liquid condensate outlet and liquid sorbate is directly recovered as liquid from the same unit used for adsorption and desorption.

8 Claims, 2 Drawing Sheets

OTHER PUBLICATIONS

M. Lordgooei, K.R. Carmichael, T.W. Kelly, M.J. Rood, S.M. Larson, "Activated Carbon Cloth Adsorption–Cryogenic System to Recover Toxic Volatile Organic Compounds", *Gas Separation & Purification*, vol. 10, No. 2, Jun. 1996, pp. 123–130.

M. Petkovska, M. Mitrovic, "One–Dimensional, Non–Adiabatic, Microscopic Model of Electrothermal Desorption Process Dynamics", *Chemical Engineering Reseach & Design*, vol. 72, No. A6, Nov. 1994, pp. 713–722.

M. Petkovska, M. Mitrovic, "Microscopic Modelling of Electrothermal Desorptin", *Chemical Engineering Journal & the Biochemical Engineering Journal*, vol. 53, No. 3, Feb. 1994, pp. 157–165.

M. Petkovska, D. Tondeur, G. Grevillot, J. Granger, M. Mitrovic,"Temperature–Swing Gas Separation with Electrothermal Desorption Step", *Separation Science & Technology*, vol. 26, No. 3, Mar. 1991, pp. 425–444.

C.A. Latta, "Methods for Reducing NOx Emissions", *Plant Engineering Magazine*, Sep. 1998.

P.M. Coss, C.Y. Cha, "Microwave Regeneration of Activated Carbon Used for Removal of Solvents from Vented Air", *Journal of the Air & Waste Management Association*, vol. 50, Apr. 2000, pp. 529–535.

M.J. Rood, P.D. Sullivan, "Adsorption/Desorption Cycling of Activated Carbon Fiber Adsorber with Electrothermal Desorption", USACERL Report, Dec. 6, 1999.

* cited by examiner

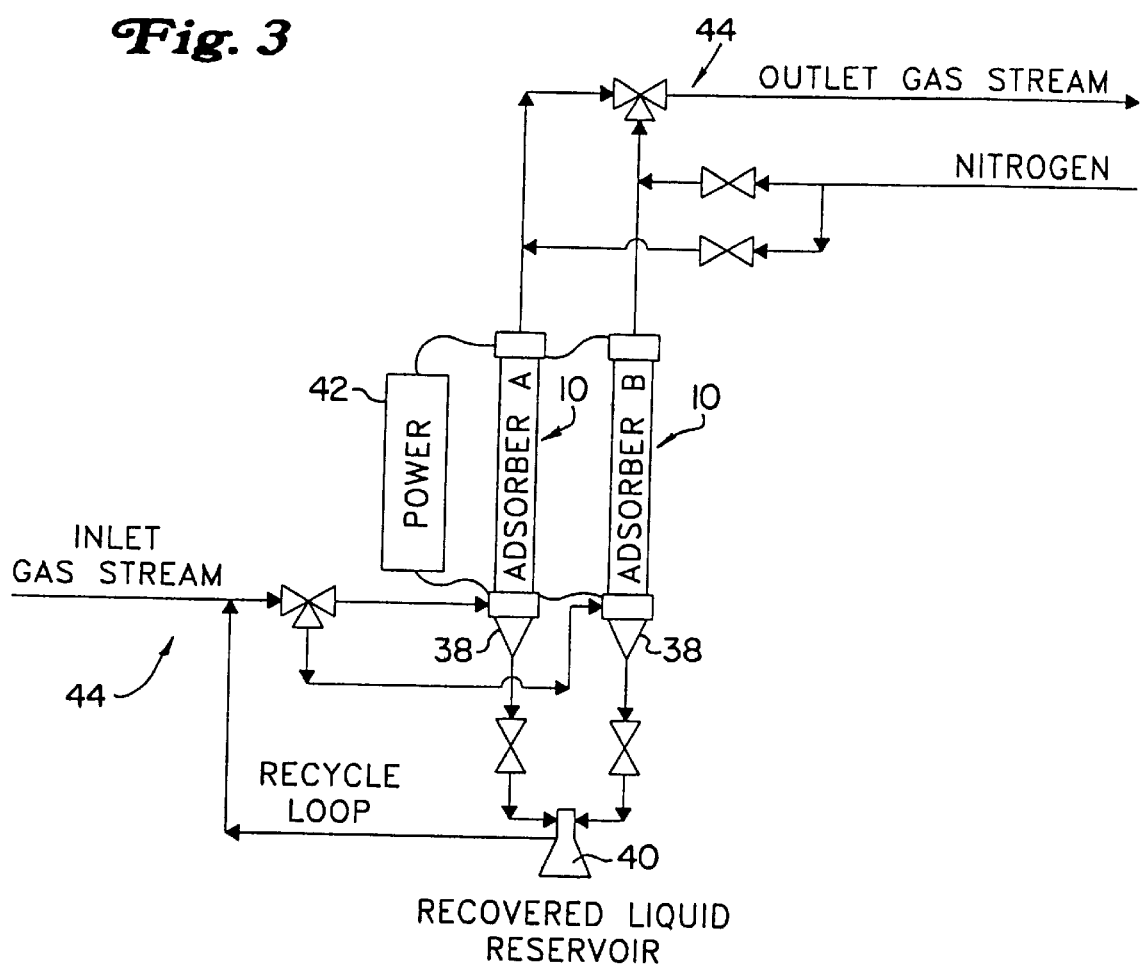

SELECTIVE SORPTION AND DESORPTION OF GASES WITH ELECTRICALLY HEATED ACTIVATED CARBON FIBER CLOTH ELEMENT

FIELD OF THE INVENTION

The field of the invention is gas stream treatment.

BACKGROUND OF THE INVENTION

Various industrial processes produce pollutant vapors and gases. These vapors and gases should be treated to avoid release of pollutants into the atmosphere. Other industries produce gases which include end product, e.g., paint. Recapture of end product increases the yield of a manufacturing process. Various processes have been developed to treat gas streams to serve these and other applications. Each seeks to remove gases from a gas stream.

Adsorption is a particularly useful technique. Adsorption removes a wide range of gas stream components. Adsorption process includes an adsorption step and a desorption step. During the adsorption step, the gas stream is brought into contact with sorbent in the form of granular activated carbon or zeolites. Gases adhere to the sorbent carbon or zeolite surfaces due to molecular attractive forces. The adsorbed gases are recovered during the desorption step. They are typically released by lowering pressure or by raising temperature. A typical method to raise temperature is by injection of steam. In the conventional processes, recovered adsorbed gases are often burned or converted to liquid through a refrigeration unit downstream of the desorption flow from an adsorption/desorption unit.

Other recovery techniques include material substitution, thermal oxidation, membrane filtering, absorption, and condensation. The adsorption technique is advantageous due to its wide ranging applicability, comparatively low energy requirements, and its ability to recover gas stream components which have been recaptured. Adsorption also offers selectivity. Selectivity results if the temperature in the adsorption/desorption unit can be controlled during the adsorption step because different gases will adsorb to the sorbent carbon or zeolite surfaces at different temperatures. Selectivity has become better controlled with the use of activated carbon fiber cloth (ACFC) as a sorbent, which has also yielded additional improvements to adsorption.

ACFC has twice the capacity of conventional adsorbents. It permits the rapid capture of volatile organic contaminants even when the contaminants have low concentrations in the gas stream. ACFC is ash free, which inhibits reactions with vapors such as ketone containing organic compounds and alkenes. The ACFC processes used to date follow the model of the above described adsorption/desorption processes, with ACFC felt taking the place of beds of zeolites or granular carbon.

SUMMARY OF THE INVENTION

Further improvements are realized by the invention. In the invention, an adsorption/desorption unit includes one or more elongate hollow ACFC elements. The geometric configuration of the ACFC element or elements is designed such that the elements have an electrical resistance value sufficient to permit heating of the elements by electrical current to a temperature that permits adsorption of a select gas stream constituent or constituents. The geometry also permits gas flow to penetrate the ACFC element(s). An enclosure houses the ACFC elements and is arranged to direct gas stream flow through the elements and into and out of the enclosure via gas ports. The ability to heat the elements to a desired temperature by electrical current flow allows for straightforward implementation of selective adsorption. After an adsorption step, altering the temperature of the element or elements further enables desorption.

In an embodiment of the invention, sorbate (desorbed constituent(s)) is removed from the enclosure in a gas phase. In a particularly preferred embodiment, the enclosure with the element also includes a liquid condensation outlet and desorbed constituents are directly recovered as liquid from the same unit used for adsorption and desorption. Desorbed constituents are cooled on the uninsulated chamber's walls when gas flow rate is low during desorption and form condensate that is removed from the chamber as liquid. A system incorporating such a unit may therefore omit a separate cooling unit downstream of the adsorption/desorption unit yet still obtain liquid recovery. Local electrical heating of the ACFC during desorption removes the need to maintain a certain temperature within the desorption chamber as a whole, thus allowing condensation chilling of supersaturated desorbed constituents within the desorption chamber.

In a preferred structure, gas flow enters an ACFC element in an enclosure, and is directed through the ACFC into the enclosure volume around the ACFC. Gas flow passes through and into a second ACFC element and then exits the enclosure. The two ACFC elements are connected electrically in series. The structure is repeatable with multiple gas flows in and out of the chamber. An insulated electrical feed to the ACFC elements permits the enclosure to be metal, which is favorable for facilitating condensation.

BRIEF DESCRIPTION OF THE DRAWINGS

Other features, objects and advantages of the invention will be apparent to ordinary artisans, with reference to the detailed description and the drawings, of which:

FIG. 3 is a schematic representation of a system of the invention including an adsorber unit which achieves direct liquid recovery according to the invention, as in the FIG. 1 adsorber unit.

DETAILED DESCRIPTION OF THE PREFERRED EMBODIMENTS

Figure 1A:
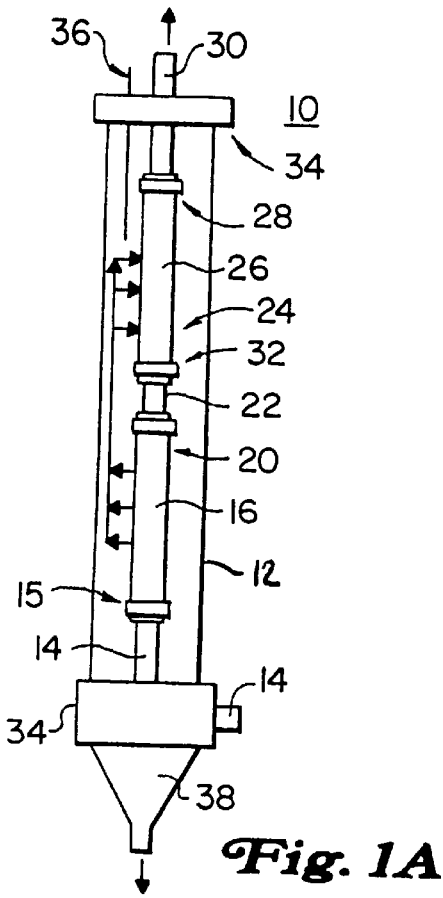
FIG. 1a is a schematic representation of a preferred adsorber unit of the invention which achieves direct liquid recovery during desorption.

Referring now to FIG. 1a, a preferred adsorber unit 10 of the invention is shown. During adsorption, gas stream enters an enclosure 12 through a port 14 and is directed into an end 15 of an elongate hollow ACFC element 16. The elongate hollow element 16 is capped on one end 20 by a cap 22. Flow is thus directed to penetrate the ACFC element 16 into a main volume 24 of the enclosure 12 within which the ACFC element 16 is contained. In the preferred FIG. 1a embodiment, is directed to penetrate a second ACFC element 26 arranged in a similar manner to the ACFC element 16, excepting an end 28 is connected to another port 30 of the enclosure 12. An opposite end 32 is capped by the cap 22, serving to direct gas flow to penetrate the ACFC element 26 en route to the port 30.

Ends of the enclosure 12 are preferably closed by insulated caps 34 around the port 14 and port 30. The insulated caps 34 serve to electrically isolate current flow from the enclosure 12, allowing a metal housing that promotes condensation by its heat transfer characteristics. Metal also creates a more scalable, cost effective and readily usable unit as compared to conventional glass and ceramic units. Electrical connection is achieved through the insulated caps to ACFC element 16 and ACFC element 26, which are also electrically connected through the cap 22. The elongate nature of the ACFC element 16 and element 26 compared to a relatively small cross section provide resistance to each element, further increased where multiple ACFC elements are connected electrically in series. The shape of the ACFC elements 16 and 26 is unimportant, though the illustrated cylindrical shape is easy to form. The ACFC material in the elements 16 and 26 may be layered, or may be formed in a single piece of suitable thickness to resist fluid flow and permit gas penetration. The purpose of the resistance obtained is to permit electrical heating of the ACFC element 16 and the ACFC element 26 to a temperature sufficient for adsorption of a desired component in a gas flow. Adjusting the electrical power adjusts temperature and accordingly offers good temperature selectivity, and the ability to selectively adsorb different constituents since different constituents adsorb at different temperatures. A series of units or elements which are heated to different temperatures may be used to remove different constituents in series fashion. The well known relationship between length, cross section, and material properties determines electrical resistance of an individual ACFC element of the invention or a series combination of such elements.

A thermocouple 36 may be used to monitor temperature of an ACFC element. Gas flow is directed through the ACFC element(s) when the elements have been heated to a temperature to accomplish adsorption to remove a component from a gas stream. During desorption, sufficient electrical power is applied to the ACFC elements to permit rapid desorption of the sorbed material, causing condensation along inner surfaces of the enclosure 12. Sides of the enclosure 12 are preferably uninsulated material having good heat transfer characteristics, such as glass or metal. Condensation has been demonstrated in an experimental scale adsorber unit where the enclosure walls were formed from Pyrex glass. The desorbed material is then removed as a liquid from the enclosure 12 via a liquid outlet 38. Gas flow during desorption should be low enough to permit cooling and condensation of the desorbed material. An inert gas (e.g, nitrogen) is used to purge adsorber unit 10 during desorption/condensation. The low flow rate inert gas preferably flows in the opposite direction during desorption as the gas flow during adsorption. Reverse flow can help purge high boiling point constituents from the ACFC elements. The inert gas displaces oxygen from the air in adsorber unit 10 to prevent oxidation from occurring during desorption.

Figure 1B:
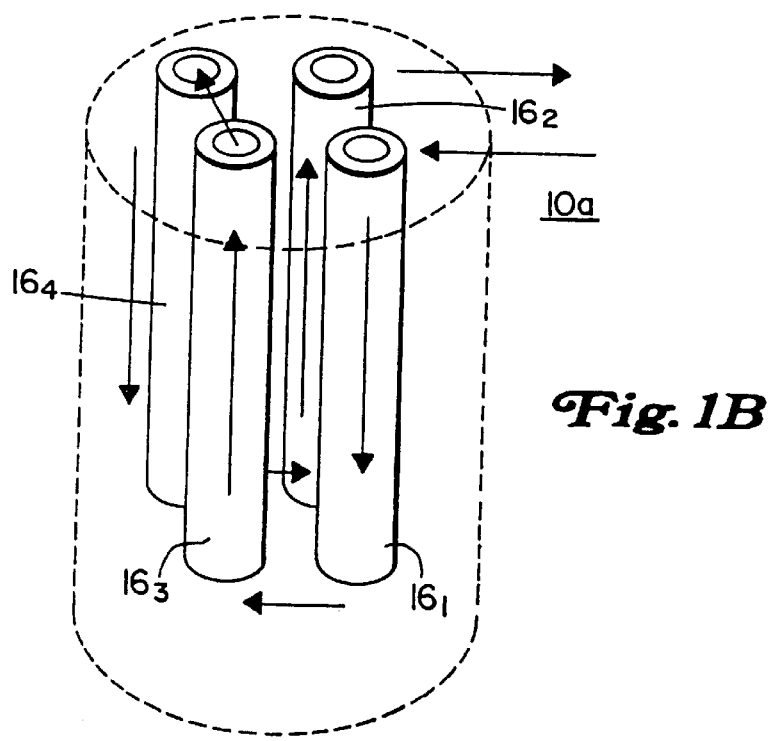
FIG. 1b is a schematic representation of a modified preferred adsorber unit of the invention.

A modified adsorber unit 10a is shown in FIG. 1b. The unit 10a includes four ACFC elements $16_1$, $16_2$, $16_3$ and $16_4$. Flows are as indicated, and the four ACFC elements are electrically in series, thus other electrical connection schemes may be used. Many other ACFC element arrangements will be apparent to artisans and are within the scope of the invention.

Figure 2:
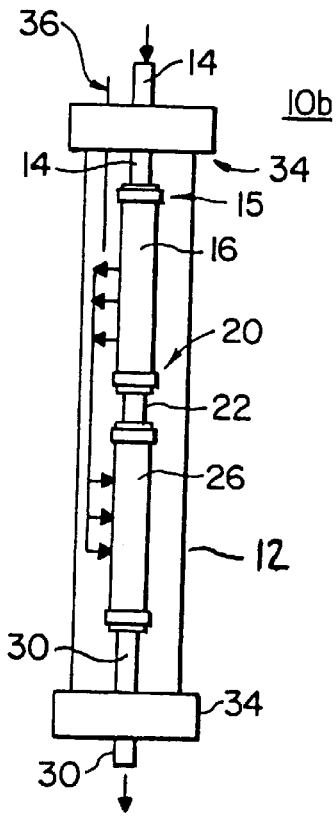
FIG. 2 is a schematic representation of an alternate preferred adsorber unit of the invention which achieves gas phase recovery during desorption.

An alternate preferred adsorber unit 10b is shown in FIG. 2, and lacks only the liquid outlet 38 of FIG. 1. Here, desorbed material is removed as a gas, and the flow and temperature conditions are therefore maintained in a device according to FIG. 2 to avoid condensation of desorbed material during desorption.

Embodiments of the invention which are most preferred, however, include a liquid outlet. Such devices enable rapid and efficient regeneration of the sorbent and allows for condensation of the sorbate all within one control volume (defined by the enclosure 12). In adsorption systems, the ability to extract sorbate as liquid from the adsorption unit eliminates the need to include separate refrigeration to convert sorbate to liquid form downstream of the adsorber unit. Such a system is shown in FIG. 3.

Typical systems require separate refrigeration downstream of outlets to enable liquid recovery, since a gas stream is output from adsorber units as a result of desorption. Using adsorber units 10 of the invention that permit direct liquid recovery from outlets 38 removes the need for a refrigeration element. Liquid sorbate flows directly into a liquid reservoir 40. A power supply 42, which may comprise a connection to a utility power network or other suitable means, is controllable to realize controlled heating of ACFC elements in the adsorber units 10, and a gas flow network 44 delivers controlled gas flow to and from the adsorber units 10.

Recycle loops formed in the gas flow network 44 allow for recycling and capture of the low flow rate saturated $N_2$ gas stream that is emitted from the adsorber units 10 or recovered liquid reservoir 40. The recycle loop improves vapor capture efficiency and eliminates the use of auxiliary devices (e.g., combustion device or adsorber) to further process the gas stream.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An adsorption and recovery method for an adsorption unit including at least one activated carbon fiber element, the method comprising steps of:

heating an activated carbon fiber element through electrical current flow, the activated carbon fiber element being configured to exhibit sufficient electrical resistance for heating;

directing a gas flow to penetrate the activated carbon fiber element when the activated carbon fiber element has been heated to selectively adsorb at least one constituent of the gas flow;

desorbing an adsorbed constituent by controlling activated carbon fiber temperature through electrical current flow to a temperature for desorption in the presence of an inert gas flow;

controlling the inert gas flow to permit condensation of a desorbed constituent on an inner surface of an enclosure housing the activated carbon fiber elements;

recovering condensate that comprises desorbed constituents in liquid phase from the enclosure.

2. An adsorber comprising:

a hollow enclosure;

at least one elongate hollow activated carbon fiber element shaped to define a volume, said activated carbon element being contained within said hollow enclosure and having a length to cross section ratio sufficient to give said activated carbon fiber element suitable electrical resistance for heating;

an electrical connection to said activated carbon fiber element; and gas ports for entrance and exit of gas flow to and from said hollow enclosure, said gas ports being arranged to direct gas flow to penetrate said at least one elongate hollow activated carbon fiber element and pass through said volume.

3. The adsorber of claim 2, wherein one of said gas ports directs gas flow into an end of said elongate hollow activated carbon fiber element, and said adsorber further comprises:

a cap to prevent gas flow from an opposite end of said elongate hollow activated carbon fiber element.

4. The adsorber of claim 3, further comprising a second elongate hollow activated carbon fiber element connected on one end to said cap and on an opposite end to another one of said gas ports, being shaped to define a volume and having a length to cross section ratio sufficient to give said activated carbon fiber element suitable electrical resistance for heating.

5. The adsorber of claim 3, further comprising a second elongate activated carbon fiber element connected on one end to said cap and on an opposite end to another one of said gas ports, being shaped to define a volume and having a length to cross section ratio sufficient to give said activated carbon fiber element an electrical resistance suitable for heating, and being electrically in series with said elongate hollow activated carbon fiber element.

6. The adsorber of claim 2, further comprising a liquid outlet from said hollow enclosure.

7. The adsorber of claim 6, wherein said enclosure includes uninsulated walls.

8. An adsorption system, the system comprising:

a hollow enclosure;

at least one elongate annular activated carbon fiber element shaped to define a volume, said activated carbon element being contained within said hollow enclosure and having a length to cross section ratio sufficient to give said activated carbon fiber element suitable electrical resistance for heating;

an electrical connection to said activated carbon fiber element; and gas ports for entrance and exit of gas flow to and from said hollow enclosure, said gas ports being arranged to direct gas flow to penetrate said at least one elongate hollow activated carbon fiber element and pass through said volume; and a liquid outlet from said hollow enclosure;

an electrical power supply connected to said electrical connection;

a condensate reservoir in fluid communication with said liquid outlet;

a gas flow control network for directing controlled gas flow into and out of said gas ports.

* * * * *

UNITED STATES PATENT AND TRADEMARK OFFICE
CERTIFICATE OF CORRECTION

PATENT NO.    : 6,364,936 B1
DATED         : April 2, 2002
INVENTOR(S)   : Rood et al.

It is certified that error appears in the above-identified patent and that said Letters Patent is hereby corrected as shown below:

<u>Column 1,</u>
Line 3, please insert the following paragraph after the title of the invention.
   -- STATEMENT OF GOVERNMENT INTEREST
   This invention was made with Government support under Contract No. DACA88-99-M-0155 and DACA88-98-D-0005-11 awarded by the United States Army. The Government has certain rights in the invention. --

Signed and Sealed this

Twenty-third Day of July, 2002

*Attest:*

*Attesting Officer*

JAMES E. ROGAN
*Director of the United States Patent and Trademark Office*